| 
US008249303B2

(12) United States Patent
Nitanda

(10) Patent No.: US 8,249,303 B2
(45) Date of Patent: Aug. 21, 2012

(54) RESTORATION APPARATUS FOR WEATHER-DEGRADED IMAGE AND DRIVER ASSISTANCE SYSTEM

(75) Inventor: Naoki Nitanda, Anjo (JP)

(73) Assignee: Denso Corporation, Kariya (JP)

( * ) Notice: Subject to any disclaimer, the term of this patent is extended or adjusted under 35 U.S.C. 154(b) by 194 days.

(21) Appl. No.: 12/802,760

(22) Filed: Jun. 14, 2010

(65) Prior Publication Data

US 2010/0322478 A1     Dec. 23, 2010

(30) Foreign Application Priority Data

Jun. 15, 2009   (JP) .................. 2009-142640

(51) Int. Cl.
*G06K 9/00*    (2006.01)
*G06K 9/40*    (2006.01)
(52) U.S. Cl. ................ 382/104; 382/168; 382/274
(58) Field of Classification Search .......... 382/104, 382/168, 274
See application file for complete search history.

(56) References Cited

U.S. PATENT DOCUMENTS

| 2008/0317287 A1 | 12/2008 | Haseyama | |
| 2010/0040300 A1* | 2/2010 | Kang et al. | 382/255 |
| 2010/0067823 A1* | 3/2010 | Kopf et al. | 382/274 |

FOREIGN PATENT DOCUMENTS

| JP | 02-078000 | 3/1990 |
| JP | 06-233309 | 8/1994 |
| JP | 2008-310509 | 12/2008 |

OTHER PUBLICATIONS

Hautiere, N.; Tarel, J.-P.; Aubert, D.; , "Towards Fog-Free In-Vehicle Vision Systems through Contrast Restoration," Computer Vision and Pattern Recognition, 2007. CVPR '07. IEEE Conference on , vol., No., pp. 1-8, Jun. 17-22, 2007.*
Dongjun Kim; Changwon Jeon; Bonghyup Kang; Hanseok Ko; , "Enhancement of image degraded by fog using cost function based on human visual model," Multisensor Fusion and Integration for Intelligent Systems, 2008. MFI 2008. IEEE International Conference on , vol., No., pp. 64-67, Aug. 20-22, 2008.*
Hautiere, N.; Aubert, D.; , "Contrast restoration of foggy images through use of an onboard camera," Intelligent Transportation Systems, 2005. Proceedings. 2005 IEEE , vol., No., pp. 601-606, Sep. 13-15, 2005.*

* cited by examiner

*Primary Examiner* — Bhavesh Mehta
*Assistant Examiner* — Utpal Shah
(74) *Attorney, Agent, or Firm* — Harness, Dickey & Pierce, PLC

(57) ABSTRACT

In a restoration apparatus, an estimating unit divides a captured original image into a plurality of local pixel blocks, and estimates an luminance level of airlight in each of the plurality of local pixel blocks. A calculating unit directly calculates, from a particle-affected luminance model, a luminance level of each pixel of each of the plurality of local pixel blocks in the original image to thereby generate, based on the luminance level of each pixel of each of the plurality of local pixel blocks, a restored image of the original image. The particle-affected luminance model expresses an intrinsic luminance of a target observed by the image pickup device as a function between the luminance level of airlight and an extinction coefficient. The extinction coefficient represents the concentration of particles in the atmosphere.

9 Claims, 9 Drawing Sheets

RESTORATION APPARATUS FOR WEATHER-DEGRADED IMAGE AND DRIVER ASSISTANCE SYSTEM

CROSS REFERENCE TO RELATED APPLICATIONS

This application is based on Japanese Patent Application 2009-142640 filed on Jun. 15, 2009. This application claims the benefit of priority from the Japanese Patent Application, so that the descriptions of which are all incorporated herein by reference.

FIELD OF THE INVENTION

The present invention relates to apparatuses for restoring images from weather-degraded images, such as fog-affected images, and to driver assistance systems with such an apparatus; these weather-degraded images are captured in adverse weather conditions, such as fog, mist, drizzle, sand storms (yellow sand), and rain.

BACKGROUND OF THE INVENTION

Images of scenes captured in bad weather conditions, such as in fog and sandstorm, may have poor contrasts and colors. Various types of techniques for restoring images from these weather-degraded images are known; these types of techniques are used for, for example, driver assistance systems to be installed in motor vehicles.

One type of the techniques is disclosed in US patent application Publication No. 2008/0317287 corresponding to Japanese Patent Application Publication No. 2008-310509.

The technique disclosed in the patent Publication applies Kalman filter processing to each of successive fog-affected images of a target; these successive fog-affected images are captured by a camera located above a road plane.

The Kalman filter defines, as a measurement (observation) vector, a luminance level (corresponding to a light intensity level) of each pixel of a fog-affected image (input image), and, as a state vector, an intrinsic luminance level of each pixel of the input image. The Kalman filter also defines an observation (measurement) matrix established based on parameters (deterioration parameters) representing a degree of deterioration of the luminance level of each pixel of the input image. The Kalman filter further defines a state transition matrix expressing changes that occur in the state vector during an interval between acquiring successive fog-affected images.

Specifically, the technique is configured to apply the Kalman filter processing to each of the successive fog-affected images to thereby obtain predicted levels of the state vector. The predicted levels of the state vector constitute a restored image having effects of fog substantially removed.

SUMMARY OF THE INVENTION

The inventors have discovered that there is a point that should be improved in the technique disclosed in the patent Publication.

Specifically, the technique requires calculations of the measurement matrix and the state transition matrix in order to generate a restored image. Because one of the deterioration parameters is expressed as a function of the point (vanishing point) of projection of the horizon of the road plane on the image plane of the camera, the technique needs a calculation of the position of the vanishing point in order to calculate the measurement matrix.

In addition, because the state transition matrix is expressed by a motion vector between two successive fog-affected images, the technique needs a calculation of the motion vector in order to calculate the state transmission matrix.

The load required to calculate the vanishing point and the motion vector is so high that the restoration performance of the technique may be affected by the calculation accuracy of the vanishing point and the motion vector.

In view of the circumstances set force above, the present invention seeks to provide a restoration apparatus for weather-degraded images and a driver assistance system with the restoration apparatus; this restoration apparatus is designed to address the point that should be improved in the technique set forth above.

Specifically, the present invention aims at providing a restoration apparatus for weather-degraded images and a driver assistance system with the restoration apparatus; this restoration apparatus is capable of restoring images from weather-degraded images with their calculation load being kept low.

According to one aspect of the present invention, there is provided a restoration apparatus for a weather-degraded image picked up by an image pickup device as an original image. The restoration apparatus includes an estimating unit configured to divide the original image into a plurality of local pixel blocks, and to estimate a luminance level of airlight in each of the plurality of local pixel blocks. The restoration apparatus includes a calculating unit configured to directly calculate, from a particle-affected luminance model, a luminance level of each pixel of each of the plurality of local pixel blocks in the original image to thereby generate, based on the luminance level of each pixel of each of the plurality of local pixel blocks, a restored image of the original image. The particle-affected luminance model expresses an intrinsic luminance of a target observed by the image pickup device as a function between the luminance level of airlight and an extinction coefficient. The extinction coefficient represents the concentration of particles in the atmosphere.

According to a first alternative aspect of the present invention, there is provided a driver assistance system installed in a vehicle. The driver assistance system includes a restoration apparatus for a weather-degraded image picked up by an image pickup device located on the vehicle as an original image. The restoration apparatus includes an estimating unit configured to divide the original image into a plurality of local pixel blocks, and to estimate a luminance level of airlight in each of the plurality of local pixel blocks. The restoration apparatus includes a calculating unit configured to directly calculate, from a particle-affected luminance model, a luminance level of each pixel of each of the plurality of local pixel blocks in the original image to thereby generate, based on the luminance level of each pixel of each of the plurality of local pixel blocks, a restored image of the original image. The particle-affected luminance model expresses an intrinsic luminance of a target observed by the image pickup device as a function between the luminance level of airlight and an extinction coefficient. The extinction coefficient represents the concentration of particles in the atmosphere. The driver assistance system includes a display unit configured to display the restored image generated by the restoration apparatus.

According to a second alternative aspect of the present invention, there is provided a driver assistance system installed in a vehicle. The driver assistance system includes a restoration apparatus for a weather-degraded image picked up by an image pickup device located at a predetermined position of the vehicle as an original image. The restoration apparatus includes an estimating unit configured to divide the original image into a plurality of local pixel blocks, and to estimate a luminance level of airlight in each of the plurality of local pixel blocks. The restoration apparatus includes a calculating unit configured to directly calculate, from a particle-affected luminance model, a luminance level of each pixel of each of the plurality of local pixel blocks in the original image to thereby generate, based on the luminance level of each pixel of each of the plurality of local pixel blocks, a restored image of the original image. The particle-affected luminance model expresses an intrinsic luminance of a target observed by the image pickup device as a function between the luminance level of airlight and an extinction coefficient. The extinction coefficient represents the concentration of particles in the atmosphere. The driver assistance system includes a controller configured to detect at least one of: a pedestrian around the vehicle, and traffic lanes on a road on which the vehicle is running, and control a driving of the vehicle based on the detected at least one of the pedestrian around the vehicle and traffic lanes.

According to a third alternative aspect of the present invention, there is provided a driver assistance system installed in a vehicle. The driver assistance system includes an image pickup device located at a predetermined position of the vehicle, and a restoration apparatus for a weather-degraded image picked up by the image pickup device as an original image. The restoration apparatus includes an estimating unit configured to divide the original image into a plurality of local pixel blocks, and to estimate a luminance level of airlight in each of the plurality of local pixel blocks. The restoration apparatus includes a calculating unit configured to directly calculate, from a particle-affected luminance model, a luminance level of each pixel of each of the plurality of local pixel blocks in the original image to thereby generate, based on the luminance level of each pixel of each of the plurality of local pixel blocks, a restored image of the original image. The particle-affected luminance model expresses an intrinsic luminance of a target observed by the image pickup device as a function between the luminance level of airlight and an extinction coefficient. The extinction coefficient represents the concentration of particles in the atmosphere. The restoration apparatus includes an edge image generator configured to generate, based on the restored image, an edge image with enhanced edges included in the restored image. The driver assistance system includes a controller configured to detect at least one of: a pedestrian around the vehicle, and traffic lanes on a road on which the vehicle is running, and control a driving of the vehicle based on the detected at least one of the pedestrian around the vehicle and traffic lanes.

According to a fourth alternative aspect of the present invention, there is provided a driver assistance system installed in a vehicle. The driver assistance system includes an image pickup device located at a predetermined position of the vehicle, and a restoration apparatus for a weather-degraded image picked up by the image pickup device as an original image. The restoration apparatus includes an estimating unit configured to divide the original image into a plurality of local pixel blocks, and to estimate a luminance level of airlight in each of the plurality of local pixel blocks. The restoration apparatus includes a calculating unit configured to directly calculate, from a particle-affected luminance model, a luminance level of each pixel of each of the plurality of local pixel blocks in the original image to thereby generate, based on the luminance level of each pixel of each of the plurality of local pixel blocks, a restored image of the original image. The particle-affected luminance model expresses an intrinsic luminance of a target observed by the image pickup device as a function between the luminance level of airlight and an extinction coefficient. The extinction coefficient represents the concentration of particles in the atmosphere. The original image includes successive frames. The calculating unit is configured to carry out a process of: updating a value of the extinction coefficient based on one of the successive frames as a current frame and the restored image generated based on a frame previous to the current frame; and directly calculating, from the particle-affected luminance model based on the value of the extinction coefficient, the luminance level of each pixel of each of the plurality of local pixel blocks in the current frame to thereby generate, based on the luminance level of each pixel of each of the plurality of local pixel blocks, the restored image of the current frame. The driver assistance system includes a fog lamp mounted on the vehicle, and a controller configured to control turning on and off of the fog lamp according to a change in the value of the extinction coefficient.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
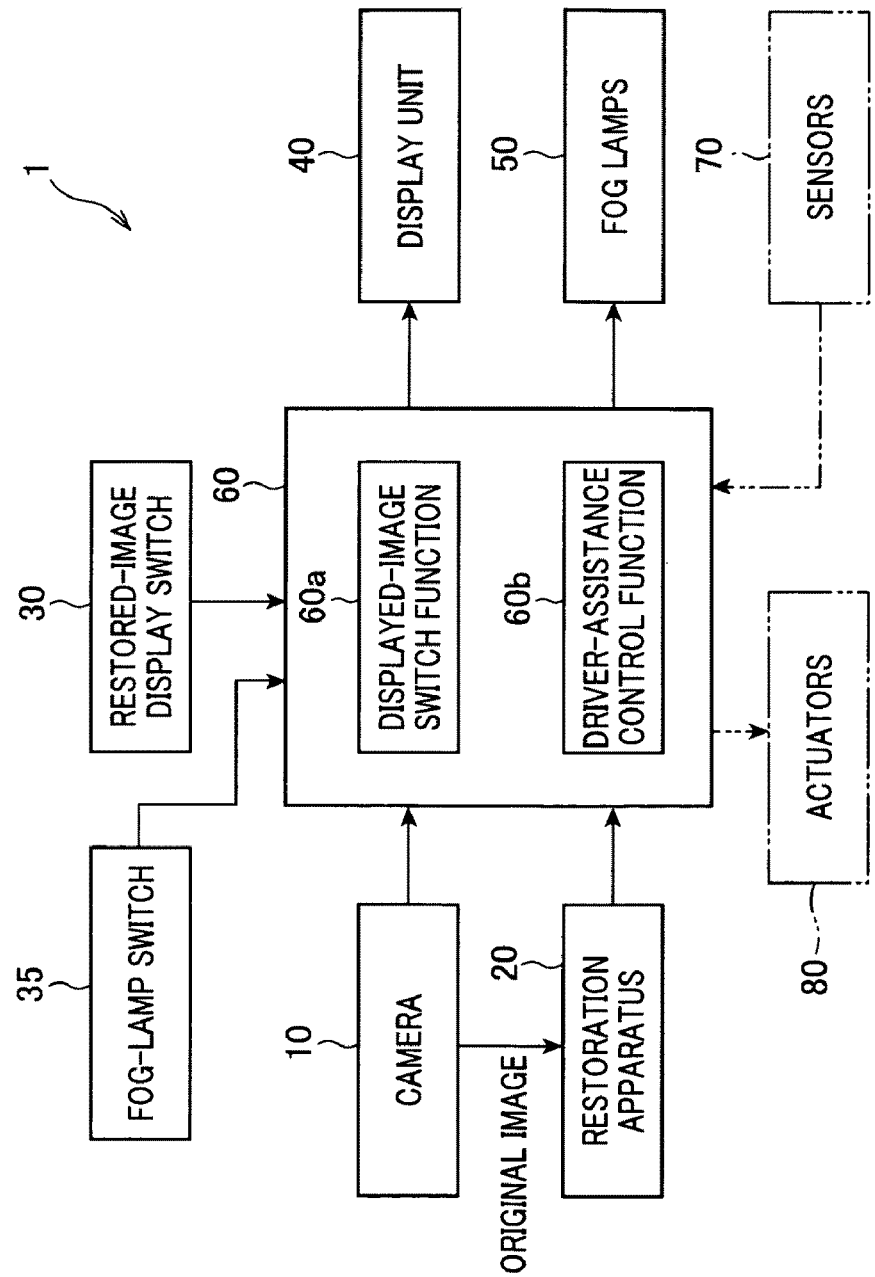
FIG. 1 is a block diagram schematically illustrating an example of the overall structure of a driver assistance system according to an embodiment of the present invention.

An embodiment of the present invention will be described hereinafter with reference to the accompanying drawings. In the drawings, identical reference characters are utilized to identify identical corresponding components.

In this embodiment, the present invention is applied to a driver assistance system 1 incorporating a restoration apparatus 20 for weather-degraded images, especially fog-affected images; this driver assistance system 1 is installed in a motor vehicle. The driver assistance system 1 aims at assisting driver's visibility.

Specifically, the driver assistance system 1 is adapted to display, on a display unit 40, restored images generated by the restoration apparatus 20, and turn fog lamps 50 on and off according to the extinction coefficient $\beta$; the extinction coefficient $\beta$ is used for the restoration apparatus 20 to generate restored images.

Referring to FIG. 1, the driver assistance system 1 includes a camera 10, the restoration apparatus 20, a restored-image display switch 30, a fog-lamp switch 35, the display unit 40, the fog lamps 50, and a controller 60. In this embodiment, the camera 10 is equivalent to an image pickup device.

The camera 10 is located at a predetermined position of the body of the vehicle and connected to the restoration apparatus 20 and the controller 60; the predetermined position allows the camera 10 to image a region ahead of the vehicle. For example, the camera 10 is located at an upper central location of the windshield in the passenger compartment of the vehicle.

The camera 10 is operative to pick up (capture) moving images and/or static images of the region ahead of the vehicle, and output the captured images in, for example digital format to each of the restoration apparatus 20 and the controller 60. In the embodiment, the camera 10 is capable of picking up color moving and static images, with 640×480 pixels horizontally and vertically arranged in matrix (rows and columns). The camera 10 can be designed to pick up color moving and static images with a desired size, or to capture monochrome moving and static images with a desired size.

The restoration apparatus 20 is designed as, for example, a normal computer circuit consisting of, for example, a CPU, a memory including a rewritable ROM and/or a RAM (Random Access Memory), an input/output (I/O) unit, other peripheral units, and buses connecting the components of the computer circuit. The restoration apparatus 20 is connected to the controller 60 in addition to the camera 10.

The restoration apparatus 20 is operative to receive, as original images, the captured images outputted from the camera 10, store the original images in the memory, generate restored images based on the original images stored in the memory, and output the restored images to the controller 60. A specific example of the structure of the restoration apparatus 20 and a specific routine to be executed thereby for generating restored images will be described later with reference to FIGS. 2 to 9.

The restored-image display switch 30 is configured as, for example, a push switch, and located at a predetermined position in the vehicle compartment; the predetermined position allows occupants, such as the driver, in the vehicle compartment to operate the restored-image display switch 30. The restored-image display switch 30 is also connected to the controller 60. When turned on by an occupant, the restored-image display switch 30 outputs a signal indicative of the on operation to the controller 60, and, when turned off by an occupant, the restored-image display switch 30 outputs a signal indicative of the off operation to the controller 60.

The fog-lamp switch 35 is configured as, for example, a three-position push switch, and located at a predetermined position in the vehicle compartment; the predetermined position allows occupants, such as the driver, in the vehicle compartment to operate the fog-lamp switch 35. The fog-lamp switch 35 is also connected to the controller 60, and switchable to a position indicative of an auto light control mode, a position of an ON mode, and a position of an OFF mode.

When switched to the position of the auto light control mode by an occupant, the fog-lamp switch 35 outputs a signal indicative of the set of the auto light control mode to the controller 60. When switched to the position of the ON mode, the fog-lamp switch 35 outputs a signal indicative of the set of the ON mode to the controller 60. When switched to the position of the OFF mode, the fog-lamp switch 35 outputs a signal indicative of the set of OFF mode to the controller 60.

The display unit 40 is comprised of, for example, an LCD (Liquid Crystal Display) with a preset gray-scale range and located at a predetermined position in the vehicle compartment, such as the display area of the instrumental panel; the predetermined position allows occupants, such as the driver, in the vehicle compartment to view the display unit 40. The display unit 40 is connected to the controller 60; this allows the original images and/or restored images to be inputted from the controller 60 to the display unit 40. The display unit 40 is operative to display the inputted original images and/or restored images.

When a navigation apparatus for providing at least one route from the current position of the vehicle to an occupant's destination is installed in the vehicle, the display of the navigation apparatus can be used as the display unit 40. A head-up display that projects images onto the windshield of the vehicle can be used as the display unit 40.

The fog lamps 50 are used in bad weather conditions to assist the driver of the vehicle during the vehicle driving in bad weather conditions in addition to the headlights of the vehicle; the headlights illuminate an area ahead of the vehicle. Specifically, the fog lamps 50 are mounted at the front of the vehicle and designed to give a wide beam lower than the illuminated area of the headlights; this wide low beam can penetrate fog and rain to thereby illuminate the road, especially its sides. The fog lamps 50 are connected to the controller 60 and are turned on or off under control of the controller 60.

The controller 60 is designed as, for example, a normal computer circuit consisting of, for example, a CPU, a memory including a rewritable ROM and/or a RAM (Random Access Memory), an input/output (I/O) unit, other peripheral units, and buses connecting the components of the computer circuit.

The controller 60 includes a displayed-image switch function 60a and a driver-assistance control function 60b. Specifically, the memory stores therein at least one program that causes the CPU to implement the displayed-image switch function 60a and the driver-assistance control function 60b.

When receiving the signal indicative of the on operation outputted from the restored-image display switch 30, the displayed-image switch function 60a displays, on the display unit 40, the restored images outputted from the restoration apparatus 20. When receiving the signal indicative of the off operation outputted from the restored-image display switch 30, the displayed-image switch function 60a displays, on the display unit 40, the original images outputted from the camera 10.

Specifically, during an original image being displayed on the display unit 40, when the signal indicative of the on operation is inputted from the switch 30 to the controller 60, the displayed-image switch function 60a switches the displayed original image to a restored image outputted from the restoration apparatus 20. Similarly, during a restored image being displayed on the display unit 40, when the signal indicative of the off operation is inputted from the switch 30 to the controller 60, the displayed-image switch function 60a switches the displayed restored image to an original image outputted from the camera 10.

In this embodiment, the displayed-image switch function 60a is programmed to switch an image to be displayed on the display unit 40 between the restored images and the original images according to occupant's manual operations of the restored-image display switch 30.

As an alternative example, the displayed-image switch function 60a can be programmed to:

display the restored images on the display unit 40 when automatically determining that the extinction coefficient $\beta$ described later is higher than a preset threshold value; and display the original images on the display unit 40 when automatically determining that the extinction coefficient $\beta$ is equal to or lower than the preset threshold value.

In this alternative example, the restored-image display switch 30 can be omitted. The displayed-image switch function 60a can use the on or off signal outputted from the switch 30 in combination with the automatic determination based on the extinction coefficient $\beta$ to thereby control the switching between the original images and the restored images.

When receiving the signal indicative of the set of the auto light control mode from the fog-lamp switch 35, the driver-assistance control function 60b automatically controls switching on and off of the fog lamps 50. Specifically, the driver-assistance control function 60b automatically turns the fog lamps 50 on when automatically determining that the extinction coefficient $\beta$ is higher than the preset threshold value, and automatically turns the fog lamps 50 off when automatically determining that the extinction coefficient $\beta$ is equal to or lower than the preset threshold value.

In addition, when receiving the signal indicative of the set of the ON mode from the fog-lamp switch 35, the driver-assistance control function 60b switches the fog lamps 50 on, and when receiving the signal indicative of the set of the OFF mode from the fog-lamp switch 35, the driver-assistance control function 60b switches the fog lamps 50 off.

Figure 2:
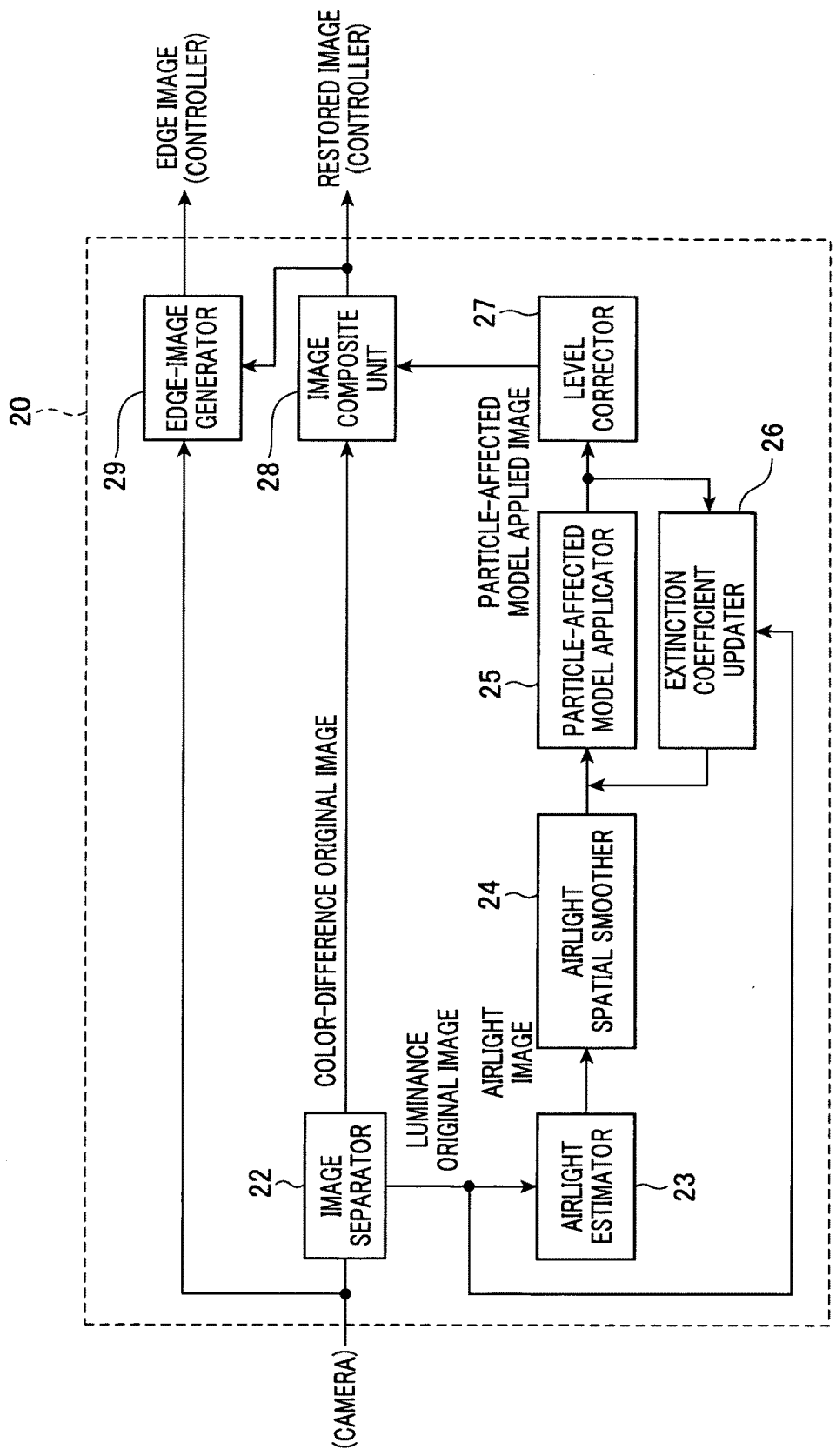
FIG. 2 is a block diagram schematically illustrating an example of the overall functional structure of a restoration apparatus installed in the driver assistance system according to the embodiment.

FIG. 2 is a block diagram illustrating an example of the overall structure of the restoration apparatus 20.

Referring to FIG. 2, the restoration apparatus 20 functionally includes an image separator 22, an airlight estimator 23, an airlight spatial smoother 24, a particle-affected model applicator 25, an extinction coefficient updater 26, a level corrector 27, and an image composite unit 28. Specifically, the memory of the restoration apparatus 20 stores therein at least one program that causes the CPU thereof to implement the functions 22 to 28.

As described above, the camera 10 is capable of capturing moving images and/or static images of the region ahead of the vehicle. Note that a moving image is equivalent to successively captured static images; these static images will be also referred to as "frames".

When a static image of the region ahead of the vehicle is captured by the camera 10, the static image is inputted to the image separator 22 as an original image. Similarly, when a moving image (video) is captured by the camera 10, a plurality of successive frames (static images) constituting the captured moving image are inputted, as successive original images, to the image separator 22 frame by frame.

The image separator 22 is operative to separate an original image inputted thereto into a color difference component and a luminance component. The image separator 22 is operative to output, to the image composite unit 28, a color-difference original image consisting of only the color difference component, and to output, to each of the airlight estimator 23 and the extinction coefficient updater 26, a luminance original image consisting of only the luminance component.

The airlight estimator 23 is operative to receive the luminance original image outputted from the image separator 22, and divide the luminance original image into a plurality of local pixel blocks. The airlight estimator 23 is also operative to estimate an airlight intensity in each of the plurality of local pixel blocks, and output, to the airlight spatial smoother 24, an airlight image consisting a plurality of pixels each having the airlight intensity.

The airlight spatial smoother 24 is operative to receive the airlight image outputted from the airlight estimator 23, spatially smooth the airlight image, and output the airlight image spatially smoothed thereby to the particle-affected model applicator 25.

The particle-affected model applicator 25 is operative to receive the spatially-smoothed airlight image outputted from the airlight spatial smoother 24, and capture a value of the extinction coefficient β from the extinction coefficient updater 26; the extinction coefficient β represents the concentration of particles in the atmosphere.

The particle-affected model applicator 25 is also operative to generate a particle-affected model applied image based on the spatially-smoothed airlight image and the value of the extinction coefficient β. The particle-affected model applicator 25 is further operative to output the generated particle-affected model applied image to the level corrector 27.

Next, specific operations of the airlight estimator 23, the airlight spatial smoother 24, the particle-affected model applicator 25, the extinction coefficient updater 26, and the level corrector 27 will be fully described hereinafter.

The restoration apparatus 20 is designed to generate a restored image using a particle-affected luminance model representing the effects of particles in the atmosphere upon the luminance (light intensity) of each pixel of an original image.

Figure 3:
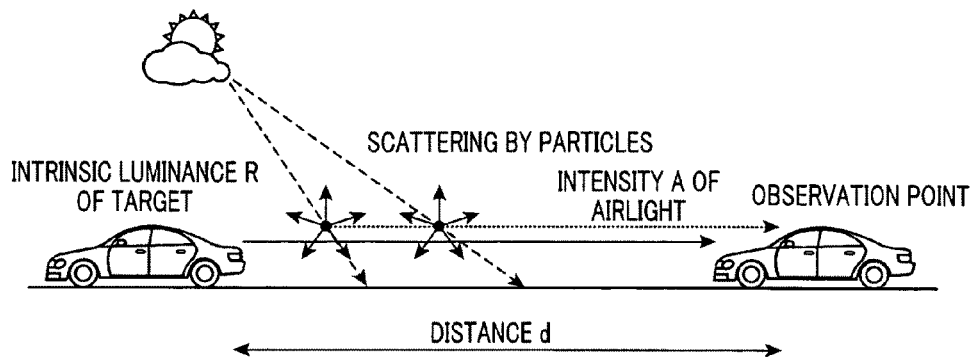
FIG. 3 is a view schematically illustrating parameters of a particle-affected light intensity model to be used by the restoration apparatus according to the embodiment.
Figure 4A:
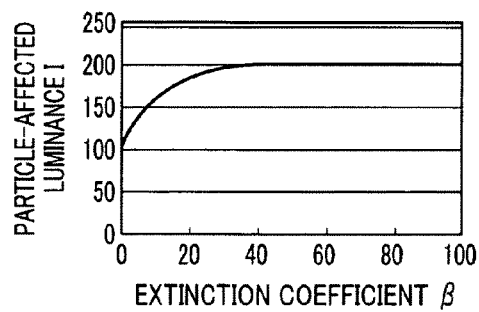
FIGS. 4A and 4B illustrate graphs of particle-affected luminance received (observed) at a camera illustrated in FIGS. 1 and 2 as a measurement point versus extinction coefficient according to the embodiment.
Figure 4B:
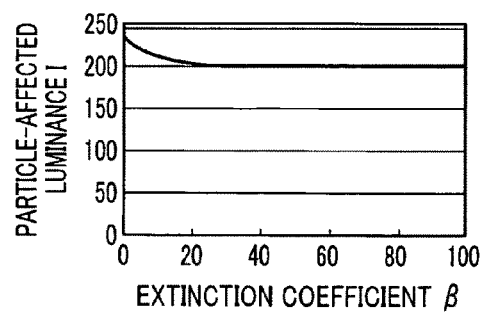

FIG. 3 illustrates parameters of the particle-affected light intensity model, and FIGS. 4A and 4B illustrate graphs of particle-affected luminance I received (observed) at the camera 10 as a measurement point versus extinction coefficient β.

The particle-affected luminance model employed in this embodiment is Koschimieder's degraded model indicative of the attenuation of the luminance of each pixel in an original image due to airlight.

When the intrinsic luminance of a target to be observed in good weather condition is designated as "R", the intensity of airlight is designed as A, and the distance between the camera 10 (observation point) and the target is designated as d, the particle-affected luminance I to be measured by the camera 10 is defined by the following equation [1] (see FIG. 3):

$$I = R \cdot e^{-\beta \cdot d} + A \cdot (1 - e^{-\beta \cdot d}) \quad [1]$$

In the particle-affected luminance model expressed in the equation [1], the particle-affected luminance I of a target is defined by the sum of the intrinsic luminance of the target and a luminance level due to absorption and/or diffusion of light with particles, such as tiny water particles (water-droplets) and sand particles, in the atmosphere.

Specifically, the particle-affected luminance model expressed in the equation [1] demonstrates that the higher the extinction coefficient β is, that is, the denser the particles are, the more the particle-affected luminance I of the target approaches the intensity A of the airlight.

FIG. 4A demonstrates the change in the particle-affected luminance I with the change in the extinction coefficient β when the intrinsic luminance R of the target, the intensity A of the airlight, and the distance d are set to 100, 200, and 0.1, respectively. In contrast, FIG. 4B demonstrates the change in the particle-affected luminance I with the change in the extinction coefficient β when the intrinsic luminance R of the target, the intensity A of the airlight, and the distance d are set to 240, 200, and 0.1, respectively.

Note that, in this embodiment, images captured by the camera 10 are images with 8-bit gray scale (256 levels of gray scale). For this reason, the particle-affected luminance I, the intrinsic luminance R of the target, and the intensity A of the airlight can take a level within the range from 0 to 255.

Comparison between FIGS. 4A and 4B shows that the denser the particles are, the more the particle-affected luminance I of the target approaches the intensity A of the airlight.

In addition, the particle-affected luminance model expressed in the equation [1] demonstrates that the more the distance d is increased, the more the particle-affected luminance I of the target approaches the intensity A of the airlight.

Deformation of the equation [1] allows the intrinsic luminance R of the target to be expressed in the following equation [2]:

$$R = I \cdot e^{\beta \cdot d} + A \cdot (1 - e^{\beta \cdot d}) \quad [2]$$

The equation [2] shows that the parameters of the distance d, the intensity A of the airlight, and the extinction coefficient β are required to obtain the particle-affected luminance I of the target. In other words, estimation of values of these parameters is required to generate restored images.

Specifically, the airlight estimator 23 according to this embodiment divides the luminance original image captured from the image separator 22 into the plurality of local pixel blocks each of which is sufficiently small in size. For example, the airlight estimator 23 according to this embodiment divides the luminance original image captured from the image separator 22 into a plurality of 3×3 pixel blocks.

Because each of the plurality of 3×3 pixel blocks has a sufficiently small size, it is possible to significantly reduce the possibility that a plurality of targets to be captured by the camera 10 are contained in at least one of the plurality of 3×3 pixel blocks. This results in that values of the distance d in each of the plurality of 3×3 pixel blocks can be considered to be constant, thus eliminating the information associated with the distance d.

For example, when the distance d is set to 1.0, the equation [2] is expressed as the following equation [3]:

$$R = I \cdot e^{\beta} + A \cdot (1 - e^{\beta}) \quad [3]$$

The equation [3] shows that the parameters of the extinction coefficient β and the intensity A of the airlight are required to obtain the particle-affected luminance I of the target.

The restoration apparatus 20 according to this embodiment is designed to generate restored images using the simplified particle-affected luminance model expressed in the equation [3].

Note that 3×3 pixel blocks are used as the local pixel blocks in this embodiment, but 5×5 pixel blocks can be used as the local pixel blocks in this embodiment. In addition, pixel blocks, each with an given size and shape, can be used as the local blocks in this embodiment; these size and shape of each of the pixel blocks make possible that a plurality of targets respectively having different distances from the camera 10 are considered to be out of each of the pixel blocks.

In addition, setting the distance d to 1.0 simplifies the fog-affected model in this embodiment, but setting the distance d to an arbitrary value can simplify the particle-affected luminance model. That is, the distance d can be set to a given value except for zero because thresholds and update (increment/decrement) variable values for the extinction coefficient β can be changed depending on the value of the distance d; these thresholds and update variable values will be described later.

This embodiment employs the simplified particle-affected luminance model obtained by simplifying the Koschimieder's degraded model, but the present invention is not limited thereto. Specifically, any particle-affected luminance model representing the effects of particles in the atmosphere can be used in place of the simplified particle-affected luminance model. More specifically, any particle-affected luminance model treating the influence of particles in the atmosphere can be used in place of the simplified particle-affected luminance model; this influence of the particles in the atmosphere represents that, the denser the particles are, the more the particle-affected luminance of the target approaches the intensity of the airlight.

After the division, the airlight estimator 23 sets an average luminance $a_k$ of all pixels of each of the 3×3 pixel blocks as a level $a_k$ of the intensity A of the airlight of a corresponding one of the 3×3 pixel blocks; k equals to 1, 2, . . . , n. n is the total number of the 3×3 pixel blocks.

The airlight estimator 23 generates the airlight image consisting the plurality of 3×3 pixel blocks, each pixel of each of the plurality of 3×3 pixel blocks having the level $a_k$ of the intensity A of the airlight of a corresponding one of the 3×3 pixel blocks. Then, the airlight estimator 23 outputs the airlight image to the airlight spatial smoother 24.

Note that the intensity A of the airlight represents the luminance of light transferred from the horizon. However, because the luminance of light transferred from the horizon may not be contained in the plurality of local pixel blocks (3×3 pixel blocks), this embodiment substitutes the average luminance of all of the plurality of local pixel blocks (3×3 pixel blocks) for the intensity A of the airlight in accordance with known Retinex theory disclosing various algorithms to estimate illumination. Thus, when the airlight estimator 23 can calculate the luminance of light transferred from the horizon, it can use the calculated luminance of light transferred from the horizon as the intensity A of the airlight.

As described above, the airlight estimator 23 individually estimates the level $a_k$ of the intensity A of the airlight of each of the 3×3 pixel blocks. For this reason, the level $a_k$ of the intensity A of the airlight of one pixel block and the level $a_k$ of the intensity A of the airlight of an alternative pixel block adjacent to the one pixel block may not be collated with each other. This results in that, if the particle-affected model applicator 25 generated an unsmoothed image directly based on the airlight image that has not been spatially smoothed by the airlight spatial smoother 24, the luminance of the unsmoothed image would become discontinuous at the boundaries of adjacent 3×3 pixel blocks in the unsmoothed image.

Figure 5A:
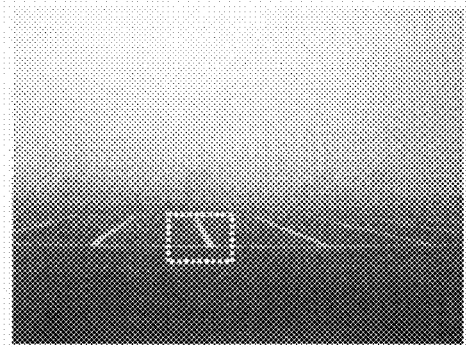
FIG. 5A is a view schematically illustrating an example of an original image captured by the camera in fog according to the embodiment.
Figure 5B:
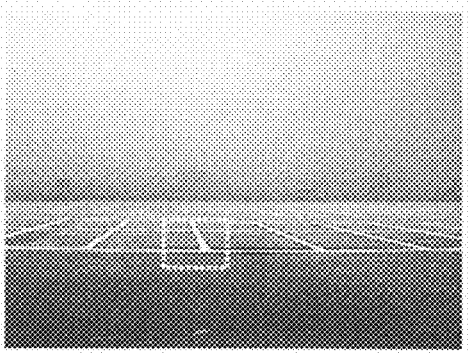
FIG. 5B is a view schematically illustrating an example of an unsmoothed image based on the original image illustrated in FIG. 5A.
Figure 5C:
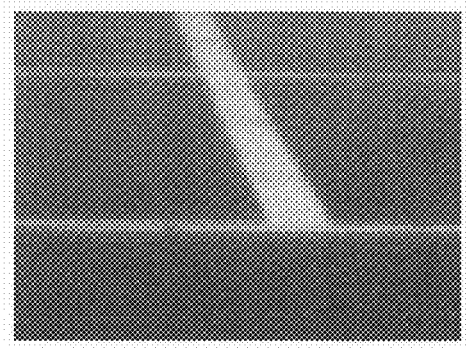
FIG. 5C is a view schematically illustrating a part of the original image illustrated in FIG. 5A in enlarged scale according to the embodiment.
Figure 5D:
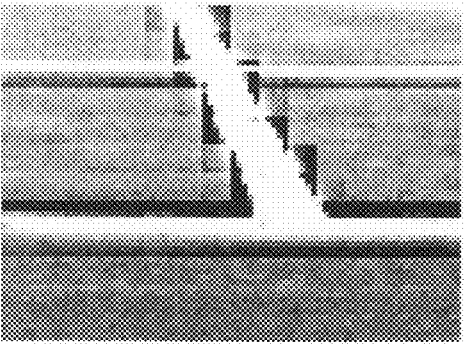
FIG. 5D is a view schematically illustrating a part of the unsmoothed image illustrated in FIG. 5B in enlarged scale according to the embodiment.

FIG. 5A illustrates an example of the original image captured by the camera 10 in fog, and FIG. 5B illustrates an example of the unsmoothed image based on the original image illustrated in FIG. 5A. In addition, FIG. 5C illustrates a part P1$a$ of the original image illustrated in FIG. 5A in enlarged scale, and FIG. 5D illustrates a part P1$b$ of the unsmoothed image illustrated in FIG. 5B in enlarged scale; this part Pib corresponds to the part P1$a$.

As seen by comparison of the original image illustrated in FIG. 5A with the unsmoothed image illustrated in FIG. 5B, the effect of fog (tiny water particles) on the unsmoothed image is more reduced than that of fog on the original image. However, as seen by comparison of the enlarged image illustrated in FIG. 5D with the enlarged image illustrated in FIG. 5C, the luminance of the unsmoothed image becomes discontinuous at the boundaries of some adjacent 3×3 pixel areas in the unsmoothed image.

In order to address the discontinuous luminance, the airlight spatial smoother 24 spatially smoothes the airlight image captured from the airlight spatial smoother 24 to mitigate the discontinuity in luminance between adjacent 3×3 pixel blocks in the received airlight image. Thereafter, the airlight spatial smoother 24 outputs the airlight image spatially smoothed thereby to the particle-affected model applicator 25.

In this embodiment, the airlight spatial smoother 24 spatially smoothes the airlight image in the row (horizontal) and column (vertical) directions using a known moving average. For example, the airlight spatial smoother 24 carries out the first smoothing of the airlight image pixel-block by pixel-block and the second smoothing of the airlight image pixel by pixel. The two-step smoothing aims at mitigating the discontinuity in luminance between adjacent 3×3 pixel blocks in the airlight image.

Figure 6A:
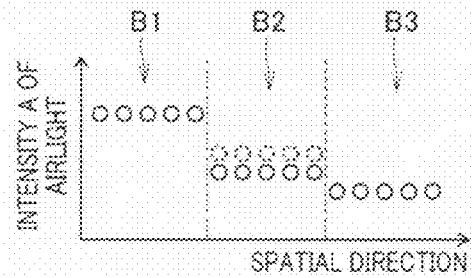
FIG. 6A is a view schematically illustrating how to smooth an airlight image pixel-block by pixel-block according to the embodiment.
Figure 6B:
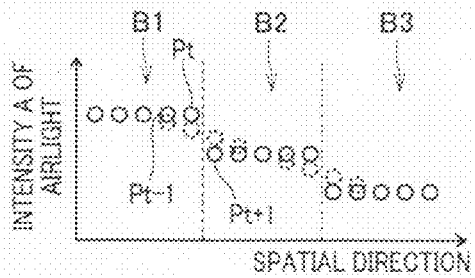
FIG. 6B is a view schematically illustrating how to smooth the airlight image pixel by pixel according to the embodiment.

FIG. 6A schematically illustrates how to smooth the airlight image pixel-block by pixel-block, and FIG. 6B schematically illustrates how to smooth the airlight image pixel by pixel. In FIGS. 6A and 6B, successive three pixel blocks B1, B2, and B3 in one of the horizontal and vertical directions are illustrated for the sake of simplicity. In FIGS. 6A and 6B, solid circles represent the luminance levels of the successive three pixel blocks B1, B2, and B3 before smoothing, dashed circles represent the luminance levels of the successive three pixel blocks after smoothing, and dashed lines represent the boundaries of the successive three pixel blocks B1, B2, and B3. In FIGS. 6A and 6B, the number of solid circles contained in each of the successive three pixel blocks B1, B2, and B3 represents the number of pixels contained therein.

First, the smoothing of the airlight image pixel-block by pixel-block will be described hereinafter with reference to FIG. 6A.

The airlight spatial smoother 24 uses a two-dimensional window with a size of 3×3 areas corresponding to 3×3 pixel blocks. Because FIG. 6A illustrates one-dimensional successive pixel blocks, the size of the window is 3 areas. The airlight spatial smoother 24 can use a one-dimensional window with a size of 3×1 area and a one-dimensional window with a size of 1×3 area corresponding to 3×3 pixel blocks (see FIG. 6A).

The airlight spatial smoother 24 sets the center area of the window at the pixel block (target pixel block) B2 between the pixel blocks B1 and B3, and sets the remaining two areas at the pixel blocks B1 and B3, respectively.

The airlight spatial smoother 24 calculates an average level of the luminance levels contained in the window, and sets, as the luminance value of the target pixel block B2, the average level. The airlight spatial smoother 24 carries out the spatial smoothing for the target pixel block, for example, four times as one set of smoothing, and applies the one set of smoothing to all of the pixel blocks as the target pixel blocks in the airlight image.

Next, the smoothing of the airlight image pixel by pixel will be described hereinafter with reference to FIG. 6B.

The airlight spatial smoother 24 uses a two-dimensional window with a size of 3×3 areas corresponding to 3×3 pixels. Because, FIG. 6B illustrates one dimensional successive pixels, the size of the window is 3 areas. The airlight spatial smoother 24 can use a one-dimensional window with a size of 3×1 area and a one-dimensional window with a size of 1×3 area corresponding to 3×3 pixels (see FIG. 6B).

The airlight spatial smoother 24 sets the center area of the window at one pixel (target pixel), reference character Pt is assigned thereto, between pixels, reference characters Pt−1 and Pt+1 are assigned thereto. The airlight spatial smoother 24 sets the remaining two areas at the pixels Pt−1 and Pt+1, respectively.

The airlight spatial smoother 24 calculates an average level of the luminance levels of the pixels Pt, Pt−1 and Pt+1 contained in the window, and sets, as the luminance level of the target pixel Pt, the average level. The airlight spatial smoother 24 carries out the spatial smoothing for the target pixel, for example, four times as one set of smoothing, and applies the one set of smoothing to all of the pixels as the target pixels in the airlight image.

Figure 7A:
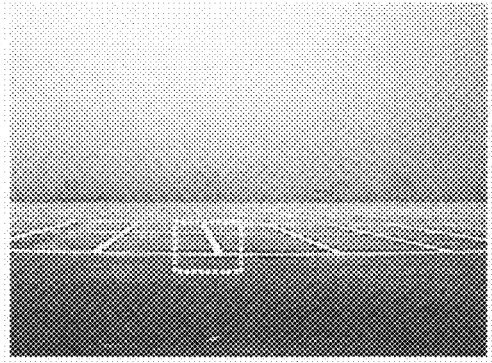
FIG. 7A is a view schematically illustrating an example of the unsmoothed image corresponding to FIG. 5B according to the embodiment.
Figure 7B:
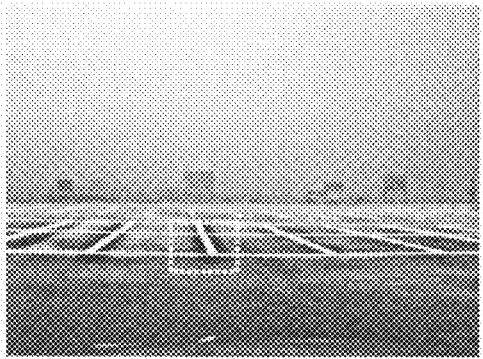
FIG. 7B is a view schematically illustrating an example of the smoothed airlight image based on the original image illustrated in FIG. 5A according to the embodiment.

FIG. 7A illustrates an example of the unsmoothed image corresponding to FIG. 5B, and FIG. 7B illustrates an example of the smoothed airlight image based on the original image illustrated in FIG. 5A. In addition, FIG. 7C illustrates the part P1b of the unsmoothed image illustrated in FIG. 7A, and FIG. 7D illustrates a part P1c of the smoothed airlight image illustrated in FIG. 7B in enlarged scale; this part P1c corresponds to the part P1b.

Figure 7C:
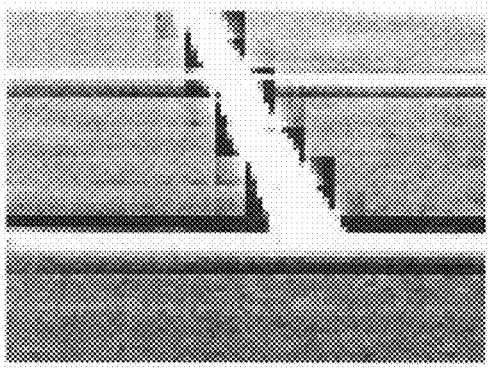
FIG. 7C is a view schematically illustrating the part of the unsmoothed image illustrated in FIG. 7A according to the embodiment.
Figure 7D:
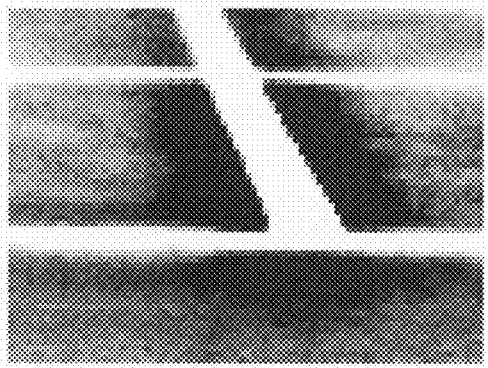
FIG. 7D is a view schematically illustrating a part of the smoothed airlight image illustrated in FIG. 7B in enlarged scale according to the embodiment.

As seen by comparison of the enlarged image illustrated in FIG. 7D with the enlarged image illustrated in FIG. 7C, the discontinuity in luminance between adjacent 3×3 pixel areas in the smoothed airlight image is restricted.

Note that the airlight spatial smoother 24 according to this embodiment uses the two-dimensional window with 3×3 areas or the one-dimensional windows with 3×1 and 1×3 sizes, but can use a two-dimensional window with 5×5 areas or 7×7 areas, or can use one-dimensional windows with 5×1 and 1×5 sizes, or 7×1 and 1×7 sizes.

The greater the number (size) of the window is, the more the advantages of smoothing can be increased. However, using the window with an excessively great size may excessively smooth edges in the airlight image. In order to prevent such excessive smoothing, the airlight spatial smoother 24 according to this embodiment uses the window with 3×3 areas.

Moreover, the airlight spatial smoother 24 according to this embodiment carries out the spatial smoothing for a target pixel block (target pixel) four times as one set of smoothing, but can carry out the spatial smoothing for a target pixel block (target pixel) eight times or once as one set of smoothing. The higher the number of times the airlight spatial smoother 24 carries out the spatial smoothing for a target pixel block (target pixel) is, the more the advantages of smoothing can be increased. However, when the number of times the airlight spatial smoother 24 carries out the spatial smoothing for a target pixel block (target pixel) is set to be excessively high, edges in the airlight image may be excessively smoothed. In order to prevent such excessive smoothing, the airlight spatial smoother 24 according to this embodiment carries out the spatial smoothing for a target pixel block (target pixel) four times as one set of smoothing.

The airlight spatial smoother 24 according to this embodiment carries out the first smoothing of the airlight image pixel-block by pixel-block and the second smoothing of the airlight image pixel by pixel, but can carry out another smoothing method.

Specifically, the airlight spatial smoother 24 can carry out one of various known smoothing methods, such as Gaussian filter method, to thereby mitigate the discontinuity in luminance between adjacent 3×3 pixel blocks in the airlight image.

The particle-affected model applicator 25 captures the spatially smoothed airlight image from the airlight spatial smoother 24, and captures a value of the extinction coefficient $\beta$ from the extinction coefficient updater 26.

Thereafter, the particle-affected model applicator 25 substitutes the luminance level of each of the pixels in the spatially smoothed airlight image as the intensity A of the airlight into the simplified particle-affected luminance model expressed in the equation [3], and substitutes the captured value of the extinction coefficient $\beta$ into the simplified particle-affected luminance model expressed in the equation [3], thus directly calculating a luminance level of each pixel of the particle-affected model applied image. Note that the same value of the extinction coefficient $\beta$ is used to calculate the luminance level of each pixel of the particle-affected model applied image.

The extinction coefficient updater 26 receives the original image (luminance original image) from the image separator 22, and receives the particle-affected model applied image from the particle-affected model applicator 25. Then, the extinction coefficient updater 26 sets (updates) the value of the extinction coefficient $\beta$ based on the intensity levels of edges in each of the original image and the particle-affected model applied image.

Figure 8:
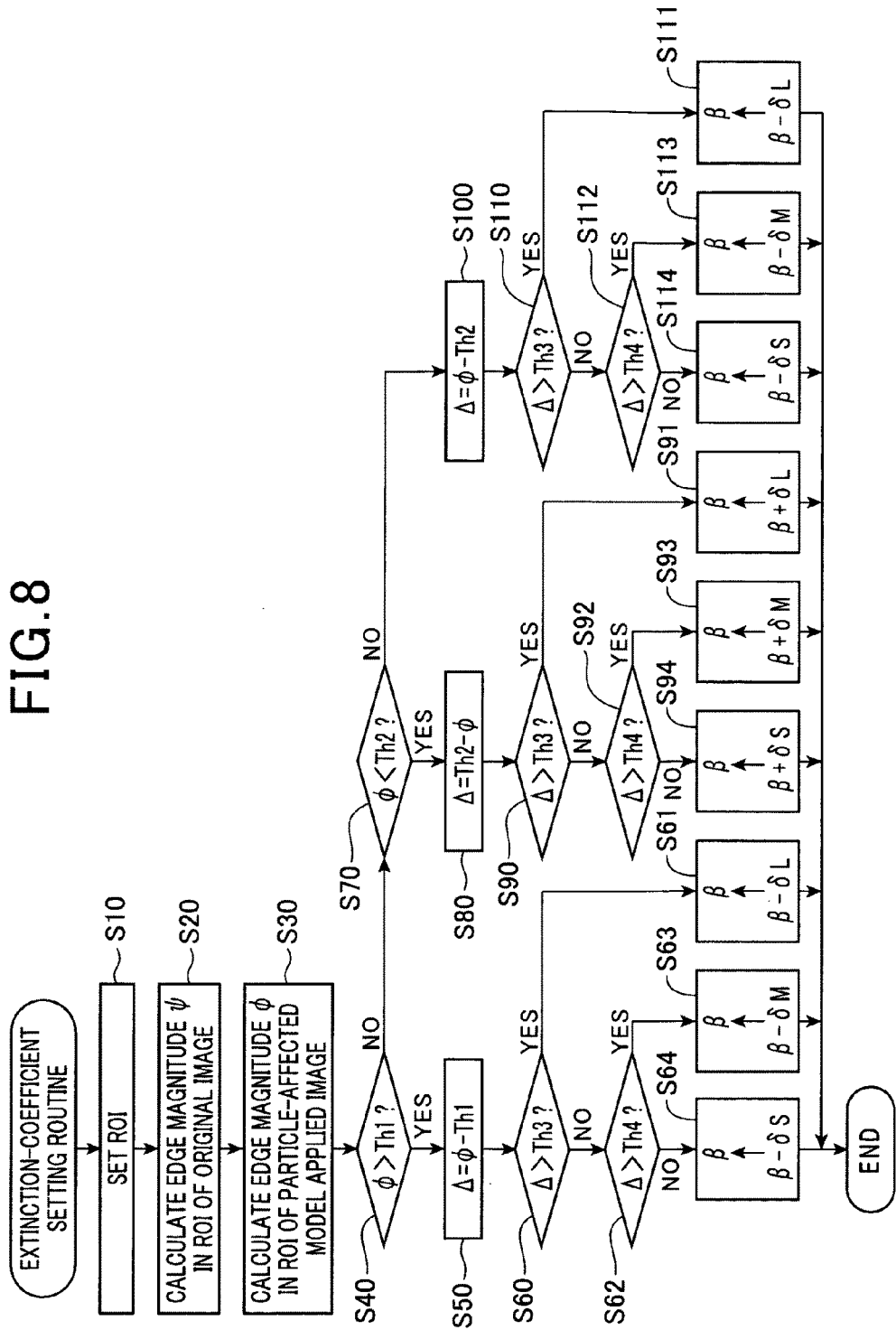
FIG. 8 is a flowchart schematically illustrating an extinction-coefficient setting routine to be executed by a controller illustrated in FIG. 1 according to the embodiment.

FIG. 8 schematically illustrates an extinction-coefficient setting (updating) routine to be executed by the extinction coefficient updater 26.

When receiving the original image from the image separator 22 and the particle-affected model applied image from the particle-affected model applicator 25, the extinction coefficient updater 26 sets a ROI (Region of Interest) with a predetermined pixel size on each of the original image and the particle-affected model applied image in step S10.

Specifically, the extinction coefficient updater 26 sets the ROI on each of the original image and the particle-affected model applied image such that the center portion (pixels) of each of the original image and the particle-affected model applied image is contained in the ROI in step S10. In step S10, the extinction coefficient updater 26 can set the ROI on each of the original image and the particle-affected model applied image such that the ROI is located close to the position of the vanishing point in each of the of the original image and the particle-affected model applied image. In this ROI setting, it is sufficient to roughly calculate the position of the vanishing point in each of the original image and the particle-affected model applied image, and therefore, it is unnecessary to calculate the position of the vanishing point at high accuracy.

After the set of the ROI on each of the original image and the particle-affected model applied image, the extinction coefficient updater 26 proceeds to step S20.

In step S20, the extinction coefficient updater 26 applies, to each pixel in the ROI of the original image, one of various edge detection operators, such as Sobel operator consisting of 3×3 Sobel convolution kernels in the vertical and horizontal directions. This application generates the gradient component (edge) at each pixel in the vertical direction, and generates the gradient component (edge) at each pixel in the horizontal direction.

In step S20, the extinction coefficient updater 26 calculates the sum (root square sum) of the gradient component in the vertical direction and the gradient component in the horizontal direction at each pixel to thereby calculate a magnitude $\psi$ of the edge at each pixel in the ROI of the original image.

The extinction coefficient updater 26 calculates an average value of the edge magnitudes $\psi$ at the respective pixels in the ROI of the original image. The average value of the edge magnitudes $\psi$ at the respective pixels in the ROI of the original image will be referred to as "the edge magnitude $\psi$" hereinafter. Thereafter, the extinction coefficient updater 26 proceeds to step S30.

In step S30, as well as step S20, the extinction coefficient updater 26 applies, to each pixel in the ROI of the particle-affected model applied image, the one of various edge detection operators, such as the Sobel operator. This application generates the gradient component at each pixel in the vertical direction, and generates the gradient component (edge) at each pixel in the horizontal direction.

In step S30, the extinction coefficient updater 26 calculates the sum (root square sum) of the gradient component in the vertical direction and the gradient component in the horizontal direction at each pixel to thereby calculate a magnitude $\Phi$ of the edge at each pixel in the ROI of the particle-affected model applied image.

The extinction coefficient updater 26 calculates an average value of the edge magnitudes $\Phi$ at the respective pixels in the ROI of the particle-affected model applied image. The average value of the edge magnitudes $\psi$ the respective pixels in the ROI of the particle-affected model applied image will be referred to as "the edge magnitude $\Phi$" hereinafter.

Next, the extinction coefficient updater 26 carries out some of the operations in steps S40 to S114 illustrated in FIG. 8 to thereby: calculate the difference $\Delta$ between the edge magnitude ($\psi$ or $\Phi$) and a preset threshold (a preset first threshold Th1 or a preset second threshold Th2), and update the extinction coefficient $\beta$ according to one of update (increment/decrement) variable values $\delta$ L, $\delta$ M, and $\delta$ S; the one of the update variable values $\delta$ L, $\delta$ M, and $\delta$ S is selected based on the degree of the difference $\Delta$. In this embodiment, the first threshold Th1 is higher than the second threshold Th2, the update variable value $\delta$ L is higher than the update variable value $\delta$ M, and the update variable value $\delta$ M is higher than the update variable value $\delta$ S.

Specifically, in step S40, the extinction coefficient updater 26 determines whether the edge magnitude $\psi$ is greater than the first threshold Th1. Upon determining that the edge magnitude $\psi$ is greater than the first threshold Th1 (YES in step S40), the extinction coefficient updater 26 calculates the difference $\Delta$ of the edge magnitude $\psi$ from the first threshold Th1 in step S50.

Subsequent to step S50, the extinction coefficient updater 26 determines whether the difference $\Delta$ of the edge magnitude $\psi$ from the first threshold Th1 is greater than a third threshold Th3 in step S60. Upon determining that the difference $\Delta$ of the edge magnitude $\psi$ from the first threshold Th1 is greater than the third threshold Th3 (YES in step S60), the extinction coefficient updater 26 recognizes that the edge magnitude $\psi$ is considerably greater than a target edge magnitude (target edge magnitude range).

Thus, the extinction coefficient updater 26 sets the previous value of the extinction coefficient $\beta$ to a new value calculated by subtracting the highest update variable value $\delta$ L from the previous value of the extinction coefficient $\beta$ in step S61. This operation in step S61 updates the previous value of the extinction coefficient $\beta$ to the new value thereof. After the operation in step S61, the extinction coefficient updater 26 exits the extinction-coefficient setting (updating) routine.

Otherwise, upon determining that the difference $\Delta$ of the edge magnitude $\psi$ from the first threshold Th1 is equal to or smaller than the third threshold Th3 (NO in step S60), the extinction coefficient updater 26 determines whether the difference $\Delta$ of the edge magnitude $\psi$ from the first threshold Th1 is greater than a fourth threshold Th4 in step S62.

Upon determining that the difference $\Delta$ of the edge magnitude $\psi$ from the first threshold Th1 is greater than the fourth threshold Th4 (YES in step S62), the extinction coefficient updater 26 recognizes that the edge magnitude $\psi$ is greater than the target edge magnitude. Thus, the extinction coefficient updater 26 sets the previous value of the extinction coefficient $\beta$ to a new value calculated by subtracting the middle update variable value $\delta$ M from the previous value of the extinction coefficient $\beta$ in step S63. This operation in step S63 updates the previous value of the extinction coefficient $\beta$ to the new value thereof. After the operation in step S63, the extinction coefficient updater 26 exits the extinction-coefficient setting (updating) routine.

Otherwise, upon determining that the difference $\Delta$ of the edge magnitude $\psi$ from the first threshold Th1 is equal to or smaller than the fourth threshold Th4 (NO in step S62), the extinction coefficient updater 26 recognizes that the edge magnitude $\psi$ is slightly greater than the target edge magnitude or close to the target edge magnitude. Thus, the extinction coefficient updater 26 sets the previous value of the extinction coefficient $\beta$ to a new value calculated by subtracting the smallest update variable value $\delta$ S from the previous value of the extinction coefficient $\beta$ in step S64 or maintains the previous value of the extinction coefficient $\beta$ as a new value thereof. This operation in step S64 updates the previous value of the extinction coefficient $\beta$ to the new value thereof. After the operation in step S64, the extinction coefficient updater 26 exits the extinction-coefficient setting (updating) routine.

Otherwise, upon determining that the edge magnitude $\psi$ is equal to or smaller than the first threshold Th1 (NO in step S40), the extinction coefficient updater 26 determines whether the edge magnitude $\Phi$ is smaller than the second threshold Th2 in step S70.

Upon determining that the edge magnitude $\Phi$ is smaller than the second threshold Th2 (YES in step S70), the extinction coefficient updater 26 calculates the difference $\Delta$ of the second threshold Th2 from the edge magnitude $\Phi$ in step S80.

Subsequent to step S80, the extinction coefficient updater 26 determines whether the difference $\Delta$ of the second threshold Th2 from the edge magnitude $\Phi$ is greater than the third threshold Th3 in step S90. Upon determining that the difference $\Delta$ of the second threshold Th2 from the edge magnitude is $\Phi$ greater than the third threshold Th3 (YES in step S90), the extinction coefficient updater 26 recognizes that the edge magnitude $\Phi$ is considerably smaller than the target edge magnitude.

Thus, the extinction coefficient updater 26 sets the previous value of the extinction coefficient $\beta$ to a new value calculated by adding the highest update variable value $\delta$ L to the previous value of the extinction coefficient $\beta$ in step S91. This operation in step S91 updates the previous value of the extinction coefficient $\beta$ to the new value thereof. After the operation in step S91, the extinction coefficient updater 26 exits the extinction-coefficient setting (updating) routine.

Otherwise, upon determining that the difference $\Delta$ of the second threshold Th2 from the edge magnitude $\Phi$ is equal to or smaller than the third threshold Th3 (NO in step S90), the extinction coefficient updater 26 determines whether the difference $\Delta$ of the second threshold Th2 from the edge magnitude $\Phi$ is greater than the fourth threshold Th4 in step S92.

Upon determining that the difference $\Delta$ of the second threshold Th2 from the edge magnitude $\Phi$ is greater than the fourth threshold Th4 (YES in step S92), the extinction coefficient updater 26 recognizes that the edge magnitude $\Phi$ is smaller than the target edge magnitude. Thus, the extinction coefficient updater 26 sets the previous value of the extinction coefficient $\beta$ to a new value calculated by adding the middle update variable value $\delta$ M to the previous value of the extinction coefficient $\beta$ in step S93. This operation in step S93 updates the previous value of the extinction coefficient $\beta$ to the new value thereof. After the operation in step S93, the extinction coefficient updater 26 exits the extinction-coefficient setting (updating) routine.

Otherwise, upon determining that the difference $\Delta$ of the second threshold Th2 from the edge magnitude $\Phi$ is equal to or smaller than the fourth threshold Th4 (NO in step S92), the extinction coefficient updater 26 recognizes that the edge magnitude $\Phi$ is slightly smaller than the target edge magnitude or close to the target edge magnitude. Thus, the extinction coefficient updater 26 sets the previous value of the extinction coefficient $\beta$ to a new value calculated by adding the smallest update variable value δ S to the previous value of the extinction coefficient β in step S94 or maintains the previous value of the extinction coefficient β as a new value thereof. This operation in step S94 updates the previous value of the extinction coefficient β to the new value thereof. After the operation in step S94, the extinction coefficient updater 26 exits the extinction-coefficient setting (updating) routine.

Otherwise, upon determining that the edge magnitude Φ is equal to or greater than the second threshold Th2 (NO in step S70), the extinction coefficient updater 26 calculates the difference Δ of the edge magnitude Φ from the second threshold Th2 in step S100.

Subsequent to step S100, the extinction coefficient updater 26 determines whether the difference Δ of the edge magnitude Φ from the second threshold Th2 is greater than the third threshold Th3 in step S110. Upon determining that the difference Δ of the edge magnitude Φ from the second threshold Th2 is greater than the third threshold Th3 (YES in step S110), the extinction coefficient updater 26 recognizes that the edge magnitude Φ is considerably greater than the target edge magnitude.

Thus, the extinction coefficient updater 26 sets the previous value of the extinction coefficient β to a new value calculated by subtracting the highest update variable value δ L from the previous value of the extinction coefficient β in step S111. This operation in step S111 updates the previous value of the extinction coefficient β to the new value thereof. After the operation in step S111, the extinction coefficient updater 26 exits the extinction-coefficient setting (updating) routine.

Otherwise, upon determining that the difference Δ of the edge magnitude Φ from the second threshold Th2 is equal to or smaller than the third threshold Th3 (NO in step S110), the extinction coefficient updater 26 determines whether the difference Δ of the edge magnitude Φ from the second threshold Th2 is greater than the fourth threshold Th4 in step S112.

Upon determining that the difference D of the edge magnitude ψ from the second threshold Th2 is greater than the fourth threshold Th4 (YES in step S112), the extinction coefficient updater 26 recognizes that the edge magnitude Φ is greater than the target edge magnitude. Thus, the extinction coefficient updater 26 sets the previous value of the extinction coefficient β to a new value calculated by subtracting the middle update variable value δ M from the previous value of the extinction coefficient β in step S113. This operation in step S113 updates the previous value of the extinction coefficient β to the new value thereof. After the operation in step S113, the extinction coefficient updater 26 exits the extinction-coefficient setting (updating) routine.

Otherwise, upon determining that the difference Δ of the edge magnitude Φ from the second threshold Th2 is equal to or smaller than the fourth threshold Th4 (NO in step S112), the extinction coefficient updater 26 recognizes that the edge magnitude Φ is slightly greater than the target edge magnitude or close to the target edge magnitude. Thus, the extinction coefficient updater 26 sets the previous value of the extinction coefficient β to a new value calculated by subtracting the smallest update variable value δ S from the previous value of the extinction coefficient β in step S94 or maintains the previous value of the extinction coefficient β as a new value thereof. This operation in step S114 updates the previous value of the extinction coefficient β to the new value thereof. After the operation in step S114, the extinction coefficient updater 26 exits the extinction-coefficient setting (updating) routine.

That is, it is assumed that a luminance original image (current frame) F(t) is separated from a captured original image as one moving image so that a current particle-affected model applied image AI(t) based on the luminance original image is generated by the particle-affected model applicator 25.

At that time, when it is determined that the luminance original image F(t) is considerably affected by particles in the atmosphere due to the increase in the density of the particles in the atmosphere (NO in step S40) but the edge magnitude Φ of the current particle-affected model applied image AI(t) is sufficiently small (YES in step S70), the extinction coefficient updater 26 updates the extinction coefficient β by incrementing it by one of the update variable values δ L, δ M, and δ S (see steps S80, and S90 to S94). The one of the update variable values δ L, δ M, and δ S is selected to make the extinction coefficient β approach a value suitable for the current weather condition.

Thus, the particle-affected model applicator 25 generates a next particle-affected model applied image AI(t+1) based on the updated value of the extinction coefficient β and a next frame F(t+1). Because the updated value of the extinction coefficient β for the next particle-affected model applied image AI(t+1) is greater than the value of the extinction coefficient β for the current particle-affected model applied image AI(t), it is possible to increase the edge magnitude Φ of the next particle-affected model applied image AI(t+1).

In contrast, when it is determined that the luminance original image F(t) is little affected by particles in the atmosphere due to the decrease in the density of the particles in the atmosphere (YES in step S40) or the edge magnitude Φ of the current particle-affected model applied image AI(t) is sufficiently large (NO in step S70), the extinction coefficient updater 26 updates the extinction coefficient β by decrementing it by one of the update variable values δ L, δ M, and δ S (see steps S50, S60 to S64 or S100, S111 to S114). The one of the update variable values δ L, δ M, and δ S is selected to make the extinction coefficient β approach a value suitable for the current weather condition.

Similarly, it is assumed that a luminance original image (current frame) F1(t) is separated from a captured original image as one static image so that a current particle-affected model applied image AI1(t) based on the luminance original image is generated by the particle-affected model applicator 25.

At that time, when it is determined that the luminance original image F1(t) is considerably affected by particles in the atmosphere due to the increase in the density of the particles in the atmosphere (NO in step S40) but the edge magnitude Φ of the current particle-affected model applied image AI1(t) is sufficiently small (YES in step S70), the extinction coefficient updater 26 updates the extinction coefficient β by incrementing it by one of the update variable values δ L, δ M, and δ S (see steps S80, and S90 to S94). The one of the update variable values δ L, δ M, and δ S is selected to make the extinction coefficient β approach a value suitable for the current weather condition.

Thus, the particle-affected model applicator 25 generates a next particle-affected model applied image AI1(t+1) based on the updated value of the extinction coefficient β and the current particle-affected model applied image AI1(t) as a next frame F1(t+1). Because the updated value of the extinction coefficient β for the next particle-affected model applied image AI1(t+1) is greater than the value of the extinction coefficient β for the current particle-affected model applied image AI1(t), it is possible to increase the edge magnitude Φ of the next particle-affected model applied image AI1(t+1).

In contrast, when it is determined that the luminance original image F1(t) is little affected by particles in the atmosphere due to the decrease in the density of the particles in the atmosphere (YES in step S40) or the edge magnitude Φ of the current particle-affected model applied image AI1(t) is sufficiently large (NO in step S70), the extinction coefficient updater 26 updates the extinction coefficient β by decrementing it by one of the update variable values δ L, δ M, and δ S (see steps S50, S60 to S64 or S100, S111 to S114). The one of the update variable values δ L, δ M, and δ S is selected to make the extinction coefficient β approach a value suitable for the current weather condition.

That is, the operations of the extinction coefficient updater 26 change the extinction coefficient β and the edge magnitude Φ appropriately to follow the change in the weather around the motor vehicle.

Note that the extinction coefficient updater 26 according to this embodiment uses the first to fourth thresholds Th1 to Th4, and selects one of the update variable values δ L, δ M, and δ S to update the extinction coefficient β according to the result of comparison between: the edge magnitude ψ and first threshold Th1; the edge magnitude Φ and the second threshold Th2; each of the third and fourth thresholds Th3 and Th4 and the difference Δ of the edge magnitude ψ or Φ from the first or second threshold Th1 or Th2; and each of the third and fourth thresholds Th3 and Th4 and the difference Δ of the second threshold Th2 from the edge magnitude Φ.

As a modification, the extinction coefficient updater 26 can use five or more thresholds, and select one of four or more update variable values including the first and second thresholds Th1 and Th2 to update the extinction coefficient β according to the result of comparison between: at least one of the five or more thresholds and at least one of the edge magnitude ψ, the edge magnitude Φ, and the difference Δ of the edge magnitude ψ or Φ from the first or second threshold Th1 or Th2.

This modification allows the extinction coefficient β and the edge magnitude Φ to more rapidly follow the change in the weather around the motor vehicle.

The extinction coefficient updater 26 according to this embodiment can use only one threshold, increment the extinction coefficient β by a preset step when the edge magnitude Φ is greater than the only one threshold, and decrement the extinction coefficient β by a preset step when the edge magnitude Φ is smaller than the only one threshold.

The level corrector 27 captures the particle-affected model applied image from the particle-affected model applicator 25, and expands or narrows the distribution of the luminance levels of the pixels of the particle-affected model applied image within a range that can be displayed on the display unit 40.

Figure 9A:
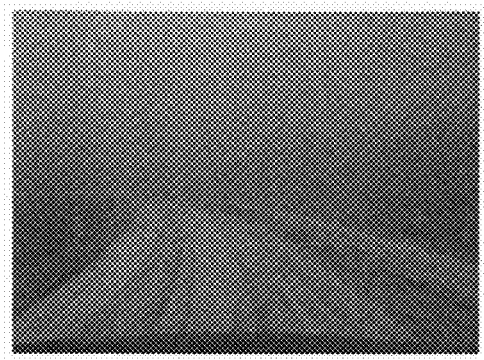
FIG. 9A is a view schematically illustrating an example of a particle-affected model applied image before level correction according to the embodiment.
Figure 9B:
FIG. 9B is a view schematically illustrating an example of the particle-affected model applied image after level correction according to the embodiment.
Figure 9C:
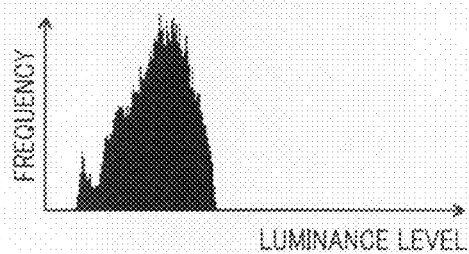
FIG. 9C is a view schematically illustrating the histogram of the luminance levels of the particle-affected model applied image illustrated in FIG. 9A.
Figure 9D:
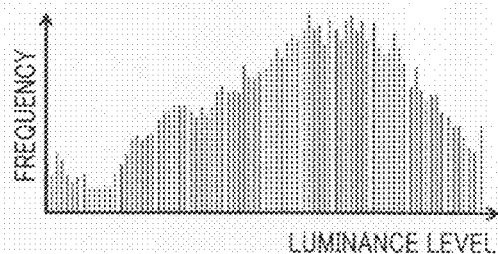
FIG. 9D is a view schematically illustrating the histogram of the luminance levels of the particle-affected model applied image illustrated in FIG. 9B.

FIG. 9A illustrates an example of the particle-affected model applied image before level correction, and FIG. 9B illustrates an example of the particle-affected model applied image after level correction. FIG. 9C illustrates the histogram of the luminance levels of the particle-affected model applied image illustrated in FIG. 9A, and FIG. 9D illustrates the histogram of the luminance levels of the particle-affected model applied image illustrated in FIG. 9B.

Referring to FIG. 9C, the level corrector 27 calculates the histogram of the luminance levels of the particle-affected model applied image captured from the particle-affected model applicator 25, and eliminates the top 5 percent and the lowest 5 percent of the luminance levels of the particle-affected model applied image. Next, as illustrated in FIG. 9D, the level corrector 27 expands the histogram of the luminance levels of the particle-affected model applied image so that the histogram of the luminance levels of the particle-affected model applied image is in agreement with the gray-scale range of the display unit 40. Thereafter, the level corrector 27 outputs, to the image composite unit 28, the particle-affected model applied image whose luminance levels have been corrected thereby.

Note that the level corrector 27 can eliminate the top 3 percent and lowest 3 percent of the luminance levels of the particle-affected model applied image, or eliminate the top 1 percent and lowest 1 percent of the luminance levels of the particle-affected model applied image. To sum up, the percentage of the luminance levels of the particle-affected model applied image to be eliminated can be determined as long as outliers included in an original image or generated by the operations of the particle-affected model applicator 25.

The image composite unit 28 combines the color-difference original image captured from the image separator 22 with the particle-affected model applied image captured from the level corrector 27 to thereby finally generate a restored image. The image composite unit 28 outputs the restored image to the controller 60.

As described above, the restoration apparatus 20 according to this embodiment is configured to:

divide, into a plurality of local pixel blocks, a luminance original image separated from an original image picked up by the camera 10; and directly calculate the luminance level of each pixel of each local pixel block in the luminance original image on the basis of the simplified particle-affected luminance model expressed in the equation [3].

Specifically, the restoration apparatus 20 according to this embodiment directly calculates the luminance level of each pixel in the luminance original image based on the simplified particle-affected luminance model expressed in the equation [3] to thereby generate a restored image without calculating vanishing points and motion vectors.

Thus, the restoration apparatus 20 achieves an advantage of generating restored images from weather-degraded images (original images) captured by the camera 10 with their calculation load being kept low; these restored images having effects of particle's, such as fog, mist, drizzle, sand storms, and rain, in the atmosphere substantially removed. The restoration apparatus 20 also achieves an advantage of preventing the deterioration of restored images due to the calculation accuracy of vanishing points and motion vectors.

In addition, because the restoration apparatus 20 requires no calculation of motion vectors, the restoration apparatus 20 is capable of generating restored images from weather-degraded static images (original images) in addition to moving images.

In order to generate a current particle-affected model applied image, the restoration apparatus 20 according to this embodiment uses an average luminance of all pixels of each of the local pixel blocks as a level of the intensity A of the airlight, and uses the extinction coefficient β determined based on a current original image (luminance original image) and a previous particle-affected model applied image.

Specifically, the restoration apparatus 20 sets (updates) the extinction coefficient β based on a current original image (luminance original image) and a previous particle-affected model applied image to thereby generate a current particle-affected model applied image based on the determined extinction coefficient β. Thus, it is possible to generate particle-affected model applied images each meeting a corresponding value of the extinction coefficient β, in other words, a corresponding value of the concentration of particles in the atmosphere.

The restoration apparatus 20 uses the first to fourth thresholds Th1 to Th4, and selects one of the update variable values δ L, δ M, and δ S according to either the edge magnitude ψ of a luminance original image (original image) or the edge magnitude $\Phi$ of a particle-affected model applied image to thereby update the extinction coefficient $\beta$ based on the selected one of the update variable values $\delta$ L, $\delta$ M, and $\delta$ S.

Thus, the restoration apparatus 20 changes the value of the update (increment/decrement) variable according to either the edge magnitude $\psi$ of the luminance original image (original image) or the edge magnitude $\Phi$ of the particle-affected model applied image. This makes it possible to increase the following capability of restored images with respect to the change in the weather around the motor vehicle (restoration apparatus 20), The restoration apparatus 20 according to this embodiment spatially smoothes an airlight image in the row (horizontal) and column (vertical) directions using a known moving average. Specifically, the restoration apparatus 20 carries out the first smoothing of the airlight image pixel-block by pixel-block and the second smoothing of the airlight image pixel by pixel. This mitigates the discontinuity in luminance between adjacent 3×3 pixel blocks in a particle-affected model applied image based on the spatially-smoothed airlight image.

The restoration apparatus 20 according to this embodiment calculates the histogram of the luminance levels of a particle-affected model applied image captured from the particle-affected model applicator 25, and eliminates the top 5 percent and the lowest 5 percent of the luminance levels of the particle-affected model applied image. In addition, the restoration apparatus 20 expands the histogram of the luminance levels of the particle-affected model applied image so that the histogram of the luminance levels of the particle-affected model applied image is in agreement with the gray-scale range of the display unit 40.

Thus, it is possible to increase the visibility of a restored image based on the particle-affected model applied image whose histogram has been corrected.

The controller 60 of the driver assistance system 1 displays, on the display unit 40, restored images outputted from the restoration apparatus 20 when receiving the signal indicative of the on operation outputted from the restored-image display switch 30, and displays, on the display unit 40, original images outputted from the camera 10 when receiving the signal indicative of the off operation outputted from the restored-image display switch 30. Thus, it is possible to effectively assist the driver's visibility according to the concentration of particles in the atmosphere.

When receiving the signal indicative of the set of the auto light control mode from the fog-lamp switch 35, the controller 60 automatically controls switching on and off of the fog lamps 50. Specifically, the controller 60 automatically turns the fog lamps 50 on when automatically determining that the extinction coefficient $\beta$ is higher than the preset threshold value, and automatically turns the fog lamps 50 off when automatically determining that the extinction coefficient $\beta$ is equal to or lower than the preset threshold value. Thus, it is possible to effectively assist the driver's visibility according to the concentration of particles in the atmosphere.

Figure 10A:
FIG. 10A is a view schematically illustrating an example of the original image captured by the camera in fog according to the embodiment.
Figure 10B:
FIG. 10B is a view schematically illustrating an example of a restored image generated by the restoration apparatus based on the original image illustrated in FIG. 10A according to the embodiment.

FIG. 10A illustrates an example of the original image captured by the camera 10 in fog, and FIG. 10B illustrates an example of the final restored image based on the original image illustrated in FIG. 10A.

As seen by comparison of the original image illustrated in FIG. 10A with the restored image illustrated in FIG. 10B, the contrast and the edge magnitude of the traffic lanes in FIG. 10B are clearly increased as compared with those in the original image illustrated in FIG. 10A, resulting in improving the driver's visibility.

Figure 11A:
FIG. 11A is a view schematically illustrating an example of the original image captured by the camera in drizzle according to the second modification of the embodiment.
Figure 11B:
FIG. 11B is a view schematically illustrating an example of a restored image generated by the restoration apparatus based on the original image illustrated in FIG. 11A according to the second modification of the embodiment.

FIG. 11A illustrates an example of the original image captured by the camera 10 in drizzle, and FIG. 11B illustrates an example of the final restored image based on the original image illustrated in FIG. 11A.

As seen by comparison of the original image illustrated in FIG. 11A with the restored image illustrated in FIG. 11B, the contrast and the edge magnitude of each of the leading vehicle and the traffic lanes in FIG. 11B are clearly increased as compared with those in the original image illustrated in FIG. 11A, resulting in improving the driver's visibility.

The driver assistance system 1 and the restoration apparatus 20 according to the present invention are not limited to the configurations of this embodiment, and therefore, various modification and deformations can be applied to the configurations of this embodiment within the scope of the present invention.

In the driver assistance system 1 according to this embodiment, the camera 10 is located at a predetermined position of the body of the vehicle; the predetermined position allows the camera 10 to image a region ahead of the vehicle, but the present invention is not limited thereto.

Specifically, the camera 10 can be located at a predetermined position of the body of the vehicle; the predetermined position allows the camera 10 to image the rear of the vehicle.

The driver assistance system 1 according to this embodiment employs the camera 10 operative to pick up moving images and static images, but the present invention employs a camera capable of picking up either moving images or static images.

Because the driver assistance system 1 according to this embodiment employs the camera 10 operative to pick up color images (moving images and static images), the restoration apparatus 20 requires the image separator 22 and the image composite unit 28. When the driver assistance system 1 employs the camera 10 operative to pick up gray-scale images (moving images and static images), the image separator 22 and the image composite unit 28 can be omitted from the image restoration apparatus 20.

The driver assistance system 1 according to this embodiment is configured to assist the driver's visibility by displaying, on the display unit 40, restored image generated by the restoration apparatus 20, and/or by automatically turning on and off the fog lamps 50, but the present invention is not limited to such driver-assist means.

The driver assistance system 1 according to a first modification is configured to detect, based on restored images generated by the restoration apparatus 20, the traffic lanes in the road on which the motor vehicle is running. In other words, the driver assistance system 1 is configured to detect, based on restored images generated by the restoration apparatus 20, the shape of the road on which the motor vehicle is running. The driver assistance system 1 according to the first modification is configured to assist, based on the detected traffic lanes, the driver's driving of the motor vehicle by, for example, adjusting the steering angle of the steering wheel and the speed of the motor vehicle.

Specifically, the driver assistance system 1 according to the first modification is provided with sensors 70 and actuators 80. The sensors 70 are configured to output signals indicative of a driver's inputted steering angle of the steering wheel and indicative of a speed of the motor vehicle. The actuators 80 are configured to adjust the steering angle of the motor vehicle and to control the speed of the motor vehicle.

In the first modification, the image restoration apparatus 20 further includes an edge-image generator 29 operative to generate, based on a restored image outputted from the image composite unit 28, an edge image with enhanced edges included in the restored image. The driver-assistance control function 60b according to the first modification is configured to detect the traffic lanes in the road on which the motor vehicle is running according to the edge image.

The driver-assistance control function 60b according to the first modification is designed to monitor the driver's inputted steering angle and the speed of the motor vehicle according to the signals outputted from the sensors 70, and cause the actuators 80 to assist the driver's turning effort of the steering wheel and adjust the speed of the motor vehicle based on the detected traffic lanes.

The driver assistance system 1 according to a second modification is configured to detect, based on restored images generated by the restoration apparatus 20, at least one pedestrian ahead of the motor vehicle, and assist, based on the detected at least one pedestrian, the driver's driving of the motor vehicle by, for example, giving an alarm to the driver.

Specifically, the driver assistance system 1 according to the second modification is provided with the actuators 80 including a speaker. The speaker is configured to audibly output an alarm under control of the controller 60.

In the second modification, the image restoration apparatus 20 further includes the edge-image generator 29. The driver-assistance control function 60b according to the second modification is configured to detect at least one pedestrian according to the edge image.

The driver-assistance control function 60b according to the second modification is designed to determine whether to detect at least one pedestrian according to the edge image, and cause the speaker to audibly output a warning indicative of, for example, "WATCH FOR PEDESTRIANS".

Figure 10C:
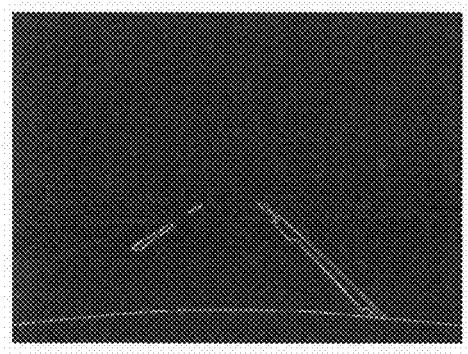
FIG. 10C is a view schematically illustrating an example of an edge image based on the original image illustrated in FIG. 10A according to the first modification of the embodiment.
Figure 10D:
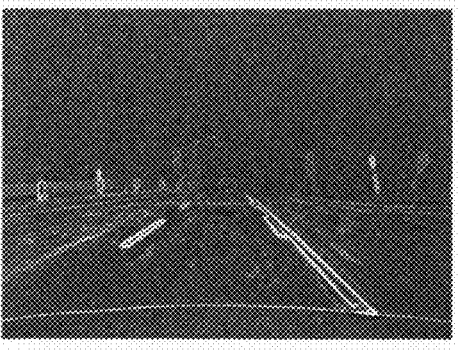
FIG. 10D is a view schematically illustrating an example of an edge image based on the restored image illustrated in FIG. 10B according to the first modification of the embodiment.

FIG. 10C illustrates an example of an edge image based on the original image illustrated in FIG. 10A, and FIG. 10D illustrates an example of an edge image based on the restored image illustrated in FIG. 10B.

As seen by comparison of the edge image illustrated in FIG. 10C with the edge image illustrated in FIG. 10D, the edge magnitude of the edge image based on the restored image is more increased than that of the edge image based on the original image although the original image is captured in fog. Thus, it is possible to improve the accuracy of detecting traffic lanes and pedestrians.

Figure 11C:
FIG. 11C is a view schematically illustrating an example of an edge image based on the original image illustrated in FIG. 11A according to the second modification of the embodiment.
Figure 11D:
FIG. 11D is a view schematically illustrating an example of an edge image based on the restored image illustrated in FIG. 11B according to the second modification of the embodiment.

FIG. 11C illustrates an example of an edge image based on the original image illustrated in FIG. 11A, and FIG. 11D illustrates an example of an edge image based on the restored image illustrated in FIG. 11B.

As seen by comparison of the edge image illustrated in FIG. 11C with the edge image illustrated in FIG. 11D, the edge magnitude of the edge image based on the restored image is more increased than that of the edge image based on the original image although the original image is captured in drizzle. Thus, it is possible to improve the accuracy of detecting traffic lanes and pedestrians.

This embodiment employs the simplified particle-affected luminance model that grasps effects of particles in the atmosphere, but the present invention can employ a particle-affected luminance model described by: the intensity of the airlight and the concentration of particles in the atmosphere.

While there has been described what is at present considered to be this embodiment and its modifications of the present invention, it will be understood that various modifications which are not described yet may be made therein, and it is intended to cover in the appended claims all such modifications as fall within the scope of the invention.

What is claimed is:

1. A fog image restoration apparatus for generating, from an original image picked up by a single image pickup device for picking up images, a restored image based on a fog model, an effect of fog being reduced from the restored image, the fog model expressing an effect of fog on a luminance level of each pixel constituting the original image, wherein the fog model is a fog model defined by the following equation:

$$R = I \cdot e^{\beta} + A \cdot (1 - e^{\beta})$$

where R represents an intrinsic luminance of a target to be picked up by the single image pickup device, I represents observed luminance of the target picked-up by the image, A represents an intensity of airlight, and $\beta$ represents an atmospheric extinction coefficient of indicative of a concentration of fog in an atmosphere, the fog image restoration apparatus comprising:

a non-transitory computer-readable storage medium storing therein at least one executable program; and a processor connected to the memory to access the at least one executable program, the processor being configured, in accordance with the at least one executable program, to:

separate the original image into a plurality of local blocks; and calculate the luminance R of each pixel by substituting the estimated intensity A of airlight, the observed luminance I of the target picked-up by the image pickup device, and the extinction coefficient $\beta$ into the fog model for each of the separated local blocks, and generates the restoration image based on the luminance R.

2. The fog image restoration apparatus according to claim 1, wherein the processor:

repeatedly generates the restoration image from the original image every preset time;

generates a fog-model applied image based on the intrinsic luminance R, the intrinsic luminance R being obtained by: substituting, as the estimated intensity A of airlight, an average luminance of a corresponding local block into an equation of the fog model in addition to the extinction coefficient $\beta$ and the observed luminance I;

compares an edge magnitude $\psi$ of the original image with a determination threshold corresponding to the edge magnitude $\psi$ to subtract, from the extinction coefficient $\beta$, an update width when the edge magnitude $\psi$ of the original image is greater than the determination threshold corresponding to the edge magnitude $\psi$, the update width being defined according to a magnitude correlation between a subtraction of the determination threshold from the edge magnitude $\psi$ and a plurality of determination thresholds for determining the update width relative to the extinction coefficient $\beta$;

compares an edge magnitude $\psi$ of the fog-model applied image with a determination threshold corresponding to the edge magnitude when the edge magnitude $\psi$ of the original image is equal to or smaller than the determination threshold corresponding to the edge magnitude $\psi$;

add, to the extinction coefficient $\beta$, an update width when the edge magnitude $\psi$ of the fog-model applied image is smaller than the determination threshold corresponding to the edge magnitude $\psi$, the update width being defined according to a magnitude correlation between a subtraction of the determination threshold from the edge magnitude $\psi$ and a plurality of determination thresholds for determining the update width relative to the extinction coefficient $\beta$; and updates the extinction coefficient $\beta$ by subtracting an update width from the extinction coefficient $\beta$ when the edge magnitude $\psi$ of the fog-model applied image is equal to or greater than the determination threshold corresponding to the edge magnitude $\psi$, the update width being defined according to a magnitude correlation between the subtraction of the determination threshold from the edge magnitude $\psi$ and the plurality of determination thresholds for determining the update width relative to the extinction coefficient $\beta$.

3. The fog image restoration apparatus according to claim 2, wherein the processor performs spatial smoothing of the fog-model applied image to mitigate a discontinuity between the local blocks.

4. The fog image restoration apparatus according to claim 1, wherein the processor corrects a histogram of the luminance levels of pixels constituting an image so that the histogram is in agreement with a maximum range displayable by a display unit.

5. The fog image restoration apparatus according to claim 1, wherein the processor generates, in addition to the restored image, an edge image with enhanced edges included in the restored image.

6. A driver assistance system comprising:
an image pickup device for picking up images;
the fog image restoration apparatus recited in claim 1; and
a display unit configured to display the restored image generated by the fog image restoration apparatus.

7. A driver assistance system comprising:
an image pickup device for picking up images;
the fog image restoration apparatus recited in claim 1; and
a controller configured to:
recognize a white line based on the restored image generated by the fog image restoration apparatus; and
control a driving of the vehicle based on a result of the recognition of the white line.

8. A driver assistance system comprising:
an image pickup device for picking up images;
the fog image restoration apparatus recited in claim 5; and
a controller configured to:
recognize a white line based on the edge image generated by the fog image restoration apparatus; and
control a driving of the vehicle based on a result of the recognition of the white line.

9. A driver assistance system comprising:
an image pickup device for picking up images;
the fog image restoration apparatus recited in claim 1;
a fog lamp mounted on a vehicle; and
a controller configured to control turning on and off of the fog lamp according to a magnitude of the atmospheric extinction coefficient $\beta$.

* * * * *